United States Patent
Yamato

(10) Patent No.: US 12,050,894 B2
(45) Date of Patent: Jul. 30, 2024

(54) OFFLOAD SERVER, OFFLOAD CONTROL METHOD, AND OFFLOAD PROGRAM

(71) Applicant: Nippon Telegraph and Telephone Corporation, Tokyo (JP)

(72) Inventor: Yoji Yamato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 119 days.

(21) Appl. No.: 17/795,431

(22) PCT Filed: Feb. 4, 2020

(86) PCT No.: PCT/JP2020/004204
§ 371 (c)(1),
(2) Date: Jul. 26, 2022

(87) PCT Pub. No.: WO2021/156956
PCT Pub. Date: Aug. 12, 2021

(65) Prior Publication Data
US 2023/0048399 A1   Feb. 16, 2023

(51) Int. Cl.
*G06F 8/41*   (2018.01)

(52) U.S. Cl.
CPC .................. *G06F 8/4436* (2013.01)

(58) Field of Classification Search
CPC .......... G06F 8/4436; G06F 8/452; G06F 8/41; G06F 11/3612; G06F 11/3466
See application file for complete search history.

(56) References Cited

U.S. PATENT DOCUMENTS

2018/0101633 A1 * 4/2018 Phoon ................... G06F 30/327

FOREIGN PATENT DOCUMENTS

WO   WO-2019216127 A1 * 11/2019 .......... G06F 11/3409

OTHER PUBLICATIONS

Ying Zhang et al.; Refactoring Android Java Code for On-Demand Computation Offloading; ACM; pp. 233-247; retrieved on Nov. 14, 2023. (Year: 2012).*
Gavin Vaz et al.; Potential and methods for embedding dynamic offloading decisions into application code; Elsevier; pp. 91-111; retrieved on Nov. 14, 2023 (Year: 2016).*

(Continued)

*Primary Examiner* — S. Sough
*Assistant Examiner* — Cuong V Luu
(74) *Attorney, Agent, or Firm* — Fish & Richardson P.C.

(57) ABSTRACT

An offload server includes: an application code analysis section configured to analyze source code of an application; a PLD processing designation section configured to identify loop statements of the application, generate a plurality of offload processing patterns designating, for each of the identified loop statements, parallel processing and/or pipeline processing on the PLD according to OpenCL, and perform compilation; an arithmetic intensity calculation section configured to calculate arithmetic intensities of the loop statements of the application; and a PLD processing pattern generation section configured to, on the basis of the arithmetic intensities calculated by the arithmetic intensity calculation section, narrow down the loop statements to, as candidates to be offloaded, those having an arithmetic intensity higher than a predetermined threshold.

7 Claims, 6 Drawing Sheets

(56) References Cited

OTHER PUBLICATIONS

Yamato; Translated WO 219/216127; 34 pages (Year: 2019).*
Yamato et al., "Automatic GPU Offloading Technology for Open IoT Environment," IEEE Internet of Things Journal, Sep. 2018, 10 pages.
Yamato et al., "Study of parallel processing area extraction and data transfer number reduction for automatic GPU offloading of IoT applications," Journal of Intelligent Information Systems, Aug. 2019, 18 pages.

* cited by examiner

OFFLOAD SERVER, OFFLOAD CONTROL METHOD, AND OFFLOAD PROGRAM

CROSS-REFERENCE TO RELATED APPLICATIONS

This is a National Stage Application of PCT Application No. PCT/JP2020/004204, filed on Feb. 4, 2020. The disclosure of the prior application is considered part of the disclosure of this application, and is incorporated in its entirety into this application.

TECHNICAL FIELD

The present invention relates to an offload server, an offload control method, and an offload program for automatically offloading functional processing to an accelerator such as an FPGA (Field Programmable Gate Array).

BACKGROUND ART

Heterogeneous computational resources, other than CPUs (Central Processing Units), are increasingly used. For example, image processing has begun to be performed on servers that use an enhanced GPU (Graphics Processing Unit) (accelerator) and signal processing has begun to be accelerated by an FPGA (accelerator). An FPGA is a programmable gate array that can be configured by a person such as a designer after manufacture and is a type of PLD (Programmable Logic Device). Amazon Web Services (AWS) (registered trademark) provides GPU instances and FPGA instances and these resources can be used on-demand as well. Microsoft (registered trademark) is using FPGAs to increase search efficiency.

In an OpenIoT (Internet of Things) environment, a wide variety of applications are expected to be created using service coordination techniques and the like, and operational applications are expected to be improved in performance by exploiting further advanced hardware. To that end, however, programing and settings adapted to the hardware to be operated are required. For example, a lot of technical knowledge regarding techniques such as CUDA (Compute Unified Device Architecture) and OpenCL (Open Computing Language) is required, making the programing and settings challenging. OpenCL is an open API (Application Programming Interface) that can uniformly handle any computational resources (not limited to CPUs and GPUs) without being bound to specific hardware.

In order to allow GPUs and FPGAs to be readily used in user's IoT applications, the following is required: when deploying a general application such as an image processing or cryptographic processing application to run in an OpenIoT environment, it is desirable that an OpenIoT platform analyze application logics and automatically offloads processing to a GPU/FPGA.

CUDA, which is a development environment for GPGPU (General Purpose GPU) which uses computational capability of a GPU for other processing in addition to image processing, are evolving. CUDA is a development environment for GPGPUs. Further, OpenCL has emerged as a standard for uniformly handling heterogeneous hardware such as GPUs, FPGAs, and many-core CPUs.

In CUDA and OpenCL, programming is performed using extensions of the C programming language. However, the difficulty of such programming is high because it requires describing memory-to-memory copy/release operations between a CPU and devices like GPUs. In fact, not many engineers can make full use of CUDA and OpenCL.

There is known a technique in which, for the purpose of using a GPGPU simply, portions to be processed in parallel, such as loop statements, are designated in a directive-based language and a compiler compiles them into device-specific code in accordance with the directives. Technical specifications include OpenACC (Open Accelerator) and the like and compilers include PGI Compiler (registered trademark) and the like. In an example using OpenACC, a user specifies, in a code written in C/C++/Fortran language, an OpenACC directive to cause parallel processing to be performed. The PGI Compiler checks the parallelizability of the code, generates execution binaries for GPU and CPU, and converts them to execution modules. IBM JDK (registered trademark) supports a function of offloading designation of parallel processing in accordance with the lambda format of Java (registered trademark) to a GPU. Using these techniques, programmers need not be aware of, for example, data allocation to GPU memory.

In this way, offload processing to a GPU or an FPGA has been enabled by techniques such as OpenCL, CUDA and OpenACC.

However, while offload processing has been enabled, there are many problems to be addressed for appropriate offloading. For example, there are compilers with automatic parallelization functions. Such compilers includes Intel compiler (registered trademark). For automatic parallelization, parallel processing portions, such as for statements (iteration statements), in a program are extracted. However, when parallel processing is performed using a GPU, it is often unable to achieve good performance due to data exchange overhead between a CPU memory and a GPU memory. To accelerate by using a GPU, a skilled person has to perform tuning in OpenCL or CUDA and to search for appropriate parallel processing portions by using PGI Compiler or the like.

For this reason, it is difficult for an unskilled user to improve the performance of an application by using a GPU. In addition, even when using an automatic parallelization technique, much time is taken for trial-and-error tuning to determine whether to parallelize for statements or not before starting use of the application.

Examples of attempts to automate trial-and-error on parallel processing portions include Non-Patent Literatures 1 and 2. Non-Patent Literatures 1 and 2 attempt to appropriately extract loop statements suitable for offloading to a GPU by repeating performance measurements in a verification environment using an evolutionary computation technique and to collectively perform a transfer of variables between a CPU and a GPU in nested loop statements at an outermost possible loop, to achieve automatic acceleration.

CITATION LIST

Non-Patent Literature

Non-Patent Literature 1: Y. Yamato, T. Demizu, H. Noguchi and M. Kataoka, "Automatic GPU Offloading Technology for Open IoT Environment, "IEEE Internet of Things Journal, September 2018.

Non-Patent Literature 2: Y. Yamato, "Study of parallel processing area extraction and data transfer number reduction for automatic GPU offloading of IoT applications," Journal of Intelligent Information Systems, Springer, DOI: 10.1007/s10844-019-00575-8, August 2019.

SUMMARY OF THE INVENTION

Technical Problem

Non-Patent Literature 1 attempts to automatically extract appropriate parallel processing areas for offloading to a GPU from general code intended for use with CPUs and to search for appropriate parallel processing areas using a GA on parallelizable loop statements, thereby to achieve automatic offloading to the GPU. When an FPGA is used, however, generally, it takes several hours to compile a program and deploy the program to run on an actual machine equipped with an FPGA, depending on the size of the program and specifications of the machine. Therefore, there is a problem in that it takes a long time to perform repetitive measurements of the performance of many patterns using a GA or the like as in Non-Patent Literature 1.

The present invention has been made in light of these circumstances and an object of the present invention is to achieve high-speed automatic offloading of loop statements of an application to a PLD (for example, an FPGA).

Means for Solving the Problem

To solve the problem described above, provided is an offload server that offloads specific processing of an application to a PLD (Programmable Logic Device), the offload server comprising: one or more hardware processors; an application code analysis section, implemented using one or more of the one or more hardware processors, configured to analyze source code of an application; a PLD processing designation section, implemented using one or more of the one or more hardware processors, configured to identify loop statements of the application, generate a plurality of offload processing patterns each of which designates parallel processing and/or pipeline processing on the PLD according to OpenCL for a respective one of the identified loop statements, and perform compilation of the application for each of the plurality of offload processing patterns; an arithmetic intensity calculation section, implemented using one or more of the one or more hardware processors, configured to calculate, for each of the loop statements of the application, an arithmetic intensity of the loop statement; a PLD processing pattern generation section, implemented using one or more of the one or more hardware processors, configured to, on the basis of the arithmetic intensities calculated by the arithmetic intensity calculation section, narrow down the loop statements to, as candidates to be offloaded, those having an arithmetic intensity higher than a predetermined threshold, and generate a plurality of PLD processing patterns based on the narrowed-down loop statements; a performance measurement section, implemented using one or more of the one or more hardware processors, configured to, for each of the generated plurality of PLD processing patterns, compile the application according to the PLD processing pattern, deploy the compiled application to an accelerator verification device, and perform processing for a measurement of a performance obtained when offloading the compiled application to the PLD according to the PLD processing pattern; and an execution file generation section, implemented using one or more of the one or more hardware processors, configured to select a PLD processing pattern with a highest processing performance as a solution from the plurality of PLD processing patterns on the basis of a result of the performance measurement by the processing for the measurement of the performance, and compile the application according to the PLD processing pattern with the highest processing performance to generate an execution file.

Effect of the Invention

According to the present invention, it is possible to perform automatic offloading of loop statements of an application to a PLD at high speed.

DESCRIPTION OF EMBODIMENTS

Figure 1:
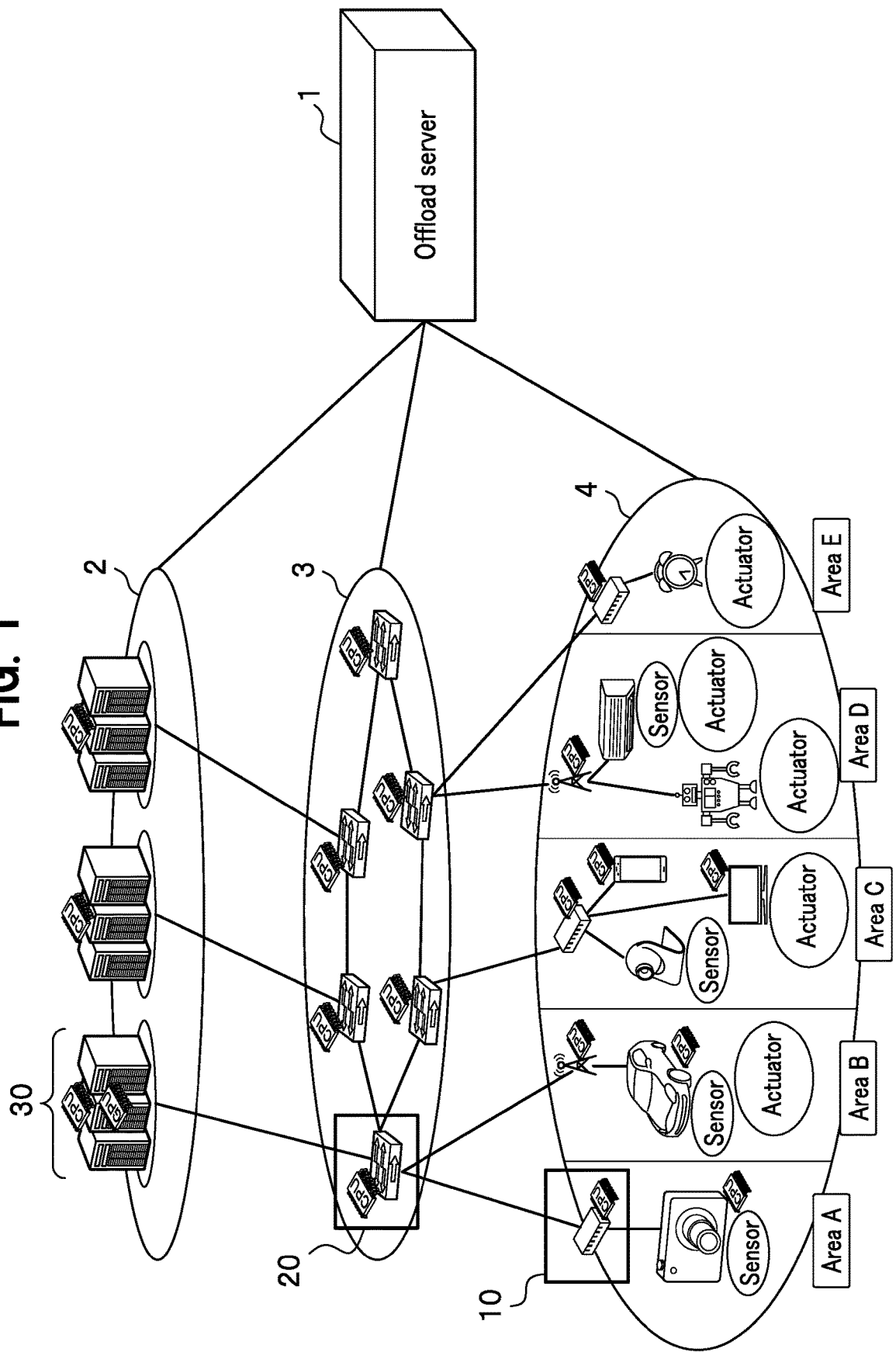
FIG. 1 is a diagram illustrating an environment adaptive software system including an offload server according to an embodiment of the present invention.

An offload server 1 and others in a mode for carrying out the present invention (hereinafter referred to as "present embodiment") will now be described.

In the following description herein, an example will be described where the present invention is applied to an FPGA (Field Programmable Gate Array) as a PLD (Programmable Logic Device). The present invention is applicable to programmable logic devices in general.

DESCRIPTION OF BACKGROUND

There are a wide variety of applications that one may desire to offload. Moreover, in applications involving a large amount of computation and consuming computation time, such as image analysis for video processing and machine learning processing for analyzing sensor data, a lot of time is spent on repetitive processing with loop statements. Therefore, acceleration by automatically offloading loop statements to an FPGA is conceivable.

First, there are the following fundamental problems with automatic offloading of loop statements to other hardware such as an FPGA. Even if a compiler is possibly able to find the restriction like "this loop statement cannot be processed with other hardware such as an FPGA", it is difficult at present for the compiler to find appropriateness like "this loop statement is appropriate for processing on other hardware such as an FPGA". Further, it is considered that, in general, loop statements with high arithmetic intensity regarding the number of loop iterations and the amount of arithmetic operations are more appropriate for automatic offloading to an FPGA. However, it is difficult to predict how much performance improvement can be achieved, without actual measurement. For these reasons, conventionally, instructions to offload loop statements to other hardware such as an FPGA are manually provided and performance measurement is performed in a trial and error fashion.

In light of the above-described problems, Non-Patent Literature 1 proposes to, using a GA (Genetic Algorithm), automatically detect appropriate loop statements to be offloaded to a GPU. In particular, Non-Patent Literature 1 proposes to: first check a general program, which is not intended to be parallelized, for parallelizable loop statements; then represent the parallelizable loop statements as a gene by assigning a value of 1 to each loop statement to be executed on a GPU and assigning a value of 0 to each loop statement to be executed on a CPU; and then repeat a performance verification trial in a verification environment to search for appropriate areas. By narrowing down to parallelizable loop statements and retaining and recombining accelerable parallel processing patterns in the form of portions of genes, a pattern that can be efficiently accelerated can be searched for from among a huge number of possible parallel processing patterns.

In the case of Non-Patent Literature 1, variables used in nested loop statements are transferred between a CPU and a GPU when the loop statements are offloaded to the GPU. However, when a transfer is performed between the CPU and the GPU at a low nesting level, transfer is performed in each iteration of the low-level loop, which is not efficient.

Non-Patent Literature 2 proposes that variables that can be transferred between a CPU and a GPU at a high nesting level without problem be collectively transferred at the high nesting level. This approach has a certain effect on acceleration by reduction in the number of transfers because loops with many loop iterations, which take long processing time, are often nested.

Non-Patent Literatures 1 attempts to, in order to automatically extract appropriate parallel processing areas for offloading to a GPU from general code intended for use with CPUs, search for more appropriate parallel processing areas using a GA on parallelizable loop statements while repeating performance verification in a verification environment including a GPU. However, when an FPGA is used, generally it takes several hours to compile a program and allow the program to run on an actual machine equipped with an FPGA, in a manner of depending on the size of the program and specifications of the machine. Therefore, it is impractical to perform repetitive measurements of the performance of many patterns using a GA or the like as described in Non-Patent Literature 1.

In view of this, it is conceivable to narrow down the patterns to be actually subjected to performance measurement and then perform deployment to an accelerator verification environment and perform compilation, to reduce the number of performance measurements on the actual machine equipped with an FPGA.

Embodiment

FIG. 1 is a diagram illustrating an environment adaptive software system including an offload server 1 according to the present embodiment.

The environment adaptive software system according to the present embodiment is characterized by including the offload server 1 in addition to the configuration of a conventional environment adaptive software. The offload server 1 is an offload server that offloads specific processing of an application to an accelerator. Further, the offload server 1 is communicatively connected to devices located in three layers, namely, a cloud layer 2, a network layer 3 and a device layer 4. Data centers 30 are deployed in the cloud layer 2, network edges 20 are deployed in the network layer 3, and gateways 10 are deployed in the device layer 4.

The environment adaptive software system including the offload server 1 according to the present embodiment achieves efficiency enhancement by appropriately performing function deployment and processing offloading in each of the device layer 4, the network layer 3, and the cloud layer 2. Mainly, the system attempts to achieve: function deployment efficiency enhancement for deploying functions in appropriate places in three layers to perform processes; and efficiency enhancement by offloading the functional processing, such as image analysis, to heterogeneous hardware, such as GPUs and FPGAs. In the cloud layer, an increasing number of servers including heterogeneous HW (hardware) (hereinafter referred to as "hetero device") such as GPUs and FPGAs are used. For example, FPGAs are also used in Bing Search provided by Microsoft (registered trademark) Corporation. In this way, performance enhancement is achieved by exploiting hetero devices to offload matrix calculations and the like, for example, to a GPU and offload specific processing such as FFT (Fast Fourier Transform) computation to an FPGA.

Hereinafter, a description will be given of an example configuration in which the offload server 1 according to the present embodiment performs offload processing in the background while services for users are being used in the environment adaptive software system.

When a service is provided, it is assumed that on the first day the service is provided to a user as trial use while offload processing of image analysis is performed in the background, then on the next day and from then on, image analysis is offloaded to an FPGA so that the watching service can be provided at a reasonable price.

Figure 2:
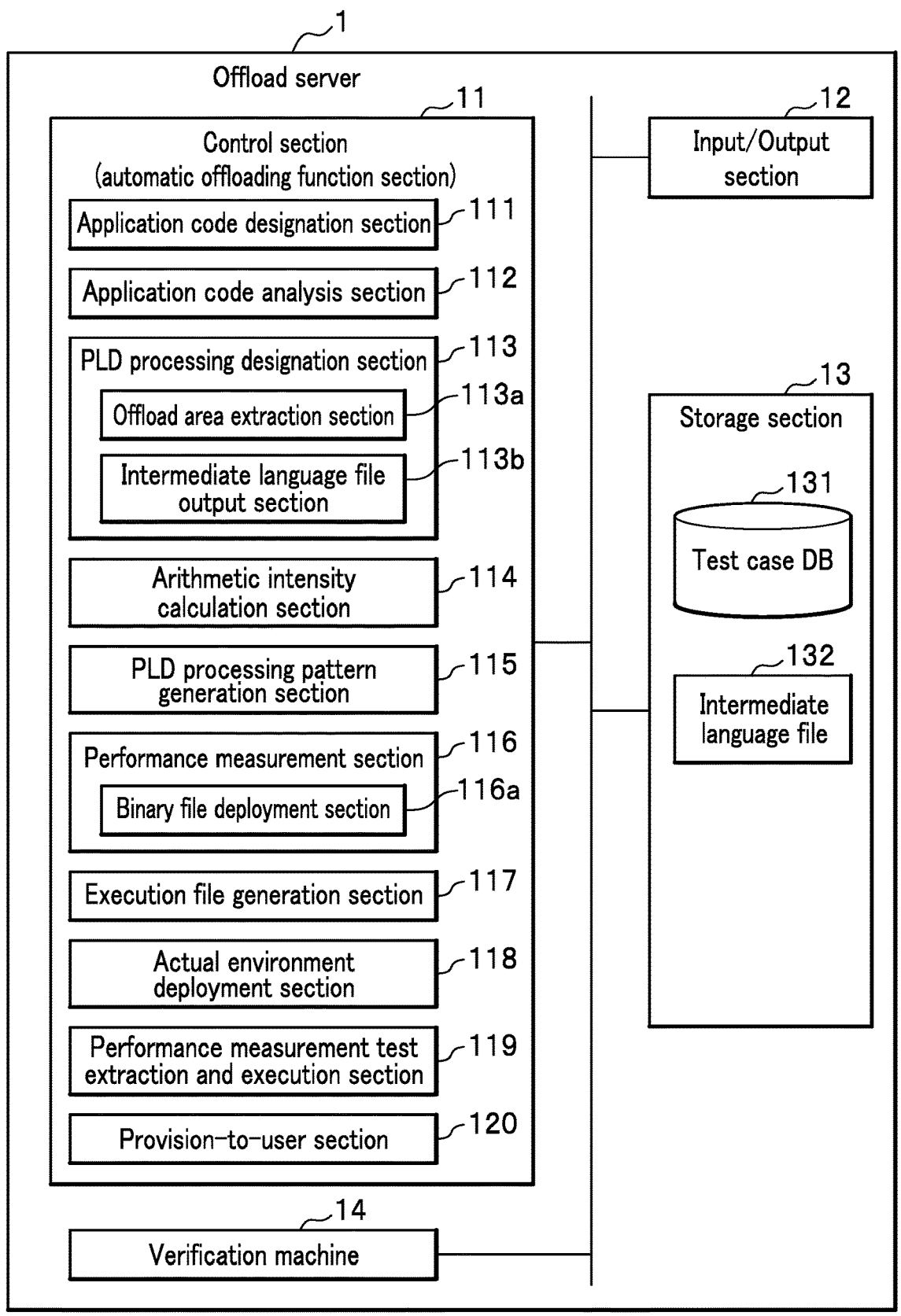
FIG. 2 is a functional block diagram illustrating an example configuration of the offload server according to the embodiment.

FIG. 2 is a functional block diagram illustrating an exemplary configuration of the offload server 1 according to the embodiment of the present invention.

The offload server 1 is a device that automatically offloads specific processing of an application to an accelerator.

Further, the offload server 1 can be connected to an emulator.

As illustrated in FIG. 2, the offload server 1 includes a control section 11, an input/output section 12, a storage section 13, and a verification machine 14 (accelerator verification device).

The input/output section 12 includes a communication interface for transmitting and receiving information to and from devices and an input/output interface for sending and receiving information to and from input devices such as a touch panel or a keyboard and output devices such as a monitor.

The storage section 13 includes a hard disk, a flash memory, a RAM (Random Access Memory) and the like.

The storage section 13 stores a test case database (DB) 131 and temporarily stores programs (offload programs) for executing functions of the control section 11 and information (e.g., an intermediate language file (intermediate file) 132) required for processing of the control section 11.

The test case database 131 stores performance test items. The test case database 131 stores information for performing a test for measuring the performance of an application to be accelerated. For example, in the case of a deep learning application for image analysis processing, sample images and test items for testing execution of the image analysis processing.

The verification machine 14 includes, as a verification environment for environment adaptive software, a CPU (Central Processing Unit), a GPU, and an FPGA (accelerator).

The control section 11 is an automatic offloading function section that is responsible for controlling the entire offload server 1. The control section 11 is embodied by a not-illustrated CPU loading a program (offload program) stored in the storage section 13 into the RAM and executing it, for example.

The control section 11 includes an application code designation section 111 (configured to designate application code), an application code analysis section 112 (configured to analyze application code), a PLD processing designation section 113, an arithmetic intensity calculation section 114, a PLD processing pattern generation section 115, a performance measurement section 116, an execution file generation section 117, an actual environment deployment section 118 (configured to deploy final binary files to actual environment) a performance measurement test extraction and execution section 119 (configured to extract performance test cases and run automatically), and a provision-to-user section 120 (configured to provide price and performance to a user to make determination)

<Application Code Designation Section 111>

The application code designation section 111 designates the input application code. Specifically, the application code designation section 111 identifies the processing function (such as image analysis) of the service being provided to a user.

<Application Code Analysis Section 112>

The application code analysis section 112 analyzes the source code of the processing function to identify structures such as loop statements and calls to an FFT library.

<PLD Processing Designation Section 113>

The PLD processing designation section 113 identifies loop statements (iteration statements) of an application, generates a plurality of offload processing patterns each of which designates pipeline processing and/or parallel processing on a PLD according to OpenCL for each of the identified loop statements, and perform compilation.

The PLD processing designation section 113 includes an offload area extraction section 113a (configured to extract offloadable area) and an intermediate language file output section 113b (configured to output intermediate file).

The offload area extraction section 113a identifies processing offloadable to the FPGA, such as loop statements and FFT operations, and extracts an intermediate language corresponding to the offload processing.

The intermediate language file output section 113b outputs the extracted intermediate language file 132. The intermediate language extraction is not ended at one time, but is repeated for optimization through execution trials to search for appropriate offload areas.

<Arithmetic Intensity Calculation Section 114>

The arithmetic intensity calculation section 114 calculates arithmetic intensities of the loop statements of the application by using an arithmetic intensity analysis tool such as ROSE Framework (registered trademark), for example. Arithmetic intensity is a value obtained by dividing the number of floating-point number (FN) operations performed during execution of a program by the number of bytes with which the program accesses the main memory. That is, arithmetic intensity is a value of FN operations/memory accesses.

Arithmetic intensity is a measure that increases as the number of calculations increases and decreases as the number of accesses increases, and thus processing with high arithmetic intensity places a heavy processing load on the processor. In view of this, the arithmetic intensities of the loop statements are analyzed using an arithmetic intensity analysis tool. The PLD processing pattern generation section 115 narrows down the loop statements to, as candidates to be offloaded, those having a high arithmetic intensity.

A description will be given of an example of computation of arithmetic intensity.

Assume that 10 floating-point-number operations (10 FLOPS) are performed in one loop iteration per 1 second and 2 bytes of data are used in the loop iteration. When data of the same size is used in each loop iteration, the arithmetic intensity is 10/2=5 [FLOPS/byte].

It should be noted that as the number of loop iterations is not taken into account for the arithmetic intensity, the present embodiment narrows down the loop statements taking into account the number of loop iterations in addition to the arithmetic intensity.

<PLD Processing Pattern Generation Section 115>

On the basis of the arithmetic intensities calculated by the arithmetic intensity calculation section 114, the PLD processing pattern generation section 115 narrows down the loop statements to, as candidates to be offloaded, those having an arithmetic intensity higher than a predetermined threshold (hereinafter referred to as high arithmetic intensity as appropriate) and generates PLD processing patterns.

Further, as basic operations, the PLD processing pattern generation section 115 excludes, from loop statements to be offloaded, any loop statement (iteration statements) at which a compilation error occurs and generates a plurality of PLD processing patterns each of which specifies whether to perform PLD processing for each of the iteration statements at which no compilation error occurs.

Function of Measuring Number of Loop Iterations

As a function of measuring the number of loop iterations, the PLD processing pattern generation section 115 measures the number of loop iterations of the loop statements of the application by using a profiling tool and narrows down the loop statements to those having a high arithmetic intensity and a greater number of loop iterations than a predetermined number of iterations (hereinafter referred to as a large number of loop iterations as appropriate). For identifying the number of loop iterations, gcov of GNU coverage or the like is used. Known profiling tools include "GNU profiler (gprof)" and "GNU coverage (gcov)". Either one of these tools may be used since both tools can check the number of execution of each line.

Further, as the number of loop iterations cannot particularly be seen with arithmetic intensity analysis, a profiling tool is used to measure the number of loop iterations in order to detect loops with many loop iterations and high loads. Here, the magnitude of the arithmetic intensity represents whether the processing is appropriate to be offloaded to an FPGA and [number of loop iterations]×[arithmetic intensity] represents whether a load relating to offloading to the FPGA is high or not.

OpenCL-Translated Code Generation Function

As an OpenCL-translated code generation function, the PLD processing pattern generation section 115 generates an OpenCL-translated code (performs translation according to OpenCL) for offloading each of the narrowed-down loop statements to an FPGA. Specifically, the PLD processing pattern generation section 115 compiles OpenCL-translated codes for offloading the narrowed-down loop statements. Further, from the loop statements having been subjected to the performance measurement, the PLD processing pattern generation section 115 makes a list of loop statements with improved performance compared with when executed on the CPU and combines the listed loop statements to generate OpenCL-translated codes to be offloaded.

A description will be given of the translation according to OpenCL.

The OpenCL code generation section 114c translates loop statements into a high-level language such as OpenCL. First, the OpenCL code generation section 114c separates the program for CPU processing into a kernel (FPGA) program and a host (CPU) program in accordance with the grammar of a high-level language such as OpenCL. For example, if one of 10 for statements is to be processed on an FPGA, the one for statement is taken out as a kernel program and described in accordance with the grammar of OpenCL. An example regarding the grammar of OpenCL will be described later.

Further, when separating the program, a technique for further speeding up can be used. In general, techniques for speeding up using an FPGA include local memory caching, stream processing, multiple instantiation, unroll processing of loop statements, integration of nested loop statements, memory interleaving and the like. These techniques are not necessarily effective for some loop statements but are commonly used as methods for speeding up.

A kernel created in accordance with the grammar of OpenCL C programming language is executed on a device (e.g., FPGA) by a host side program (e.g., CPU side program), using a runtime API of OpenCL C programming language. A portion that calls the kernel function hello( ) from the host is a call to clEnqueueTask( ) which is one of the OpenCL runtime APIs.

The basic flow of initialization, execution, and termination of the OpenCL-translated code, to be described in a host code, is described below as step 1 through step 13. Step 1 through step 10 in the steps from step 1 to step 13 are a procedure (preparation) prior to calling the kernel function hello( ) from the host and the kernel is executed in step 11.

1. Platform Identification

A platform on which OpenCL operates is identified using function clGetPlatformIDs( ) which is defined in OpenCL runtime API to provide a platform identification function.

2. Device Identification

A device, e.g., a GPU, used on the platform is identified using function clGetDeviceIDs( ) which is defined in OpenCL runtime API to provide a device identification function.

3. Context Creation

An OpenCL context, which is an execution environment to run OpenCL, is created using function clCreateContext( ), which is defined in OpenCL runtime API to provide a context creation function.

4. Command Queue Creation

A command queue is created to be ready for controlling the device, using function clCreateCommandQueue( ), which is defined in OpenCL runtime API to provide a command queue creation function. In OpenCL, actions (issuances of kernel execution commands and host-device memory copy commands) from a host to a device are performed through a command queue.

5. Memory Object Creation

A memory object that allows the host to reference the memory object is created using function clCreateBuffer( ), which is defined in the OpenCL runtime API to provide the ability to allocate memory on the device.

6. Kernel File Reading

The host program controls execution of a kernel executed on the device. Therefore, the host program first needs to read kernel programs. Kernel programs include binary data created by OpenCL compiler and source code written in OpenCL C programming language. These kernel files are read (detailed description of which is omitted). It should be noted that the OpenCL runtime API is not used when reading kernel files.

7. Program Object Creation

In OpenCL, a kernel program is recognized as a program project. This procedure is the program object creation.

A program object that allows the host to reference the memory object is created using function clCreateProgramWithSource( ), which is defined in the OpenCL runtime API to provide a function of creating a program object. When the program object is to be created from a compiled binary sequence of a kernel program, clCreateProgramWithBinary( ) is used.

8. Build

OpenCL C compiler/linker is used to build the program object registered as source code. The program object is built using function clBuildProgram( ), which is defined in the OpenCL runtime API to perform a build by the OpenCL C compiler/linker. It should be noted that if the program object has been generated from a compiled binary sequence by using clCreateProgramWithBinary( ), this compile procedure is not needed.

9. Kernel Object Creation

Kernel objects are created using function clCreateKernel( ) which is defined in the OpenCL runtime API to provide the ability to create a kernel object. A kernel function name (hello) is specified when creating a kernel object because one kernel object corresponds to one kernel function. Further, when a plurality of kernel functions are described as one program object, clCreateKernel( ) is called multiple times because one kernel object corresponds to one kernel function on a one-to-one basis.

10. Kernel Argument Setting

Kernel arguments are set using function clSetKernel( ), which is defined in the OpenCL runtime API to provide the ability to provide arguments to a kernel (to pass values to arguments of the kernel function).

The above-described steps 1 through 10 complete the preparation, and the processing flow proceeds to step 11, where the kernel is executed on the device from the host.

11. Kernel Execution

Kernel execution (queueing to the command queue) is performed by a queueing function for queueing to the command queue because the kernel execution is an action to the device.

A command to execute the kernel hello on the device is queued using function clEnqueueTask( ) which is defined in the OpenCL runtime API to provide the ability to execute a kernel. After the command to execute the kernel hello is enqueued, the command is executed on an arithmetic operation unit that can execute the command on the device.

12. Read from Memory Object

Data is copied from a memory area of the device to a memory area of the host using function clEnqueueReadBuffer( ) which is defined in the OpenCL runtime API to provide the ability to copy data from a memory of a device to a memory of a host. In addition, data is copied from a memory area of the host to a memory area of the device using function clEnqueueWriteBuffer( ) which provides a function of copying data from a host to a memory of the host. It should be noted that because these functions are actions to the device, the copy command is first queued into the command queue, then the data copy starts.

13. Object Release

Lastly, the various objects having been created are released.

Heretofore, device execution by the kernels created in accordance with the OpenCL C programming language has been described.

Resource Amount Calculation Function

As a resource amount calculation function, the PLD processing pattern generation section 115 precompiles the generated OpenCL-translated codes to calculate the amounts of the resources to be used ("first resource amount calculation"). On the basis of the calculated arithmetic intensities and the calculated amounts of the resources, the PLD processing pattern generation section 115 calculates resource efficiencies and selects c pieces of loop statements each having a resource efficiency higher than a predetermined value, on the basis of the calculated resource efficiencies.

The PLD processing pattern generation section 115 performs precompilation with combined offloading OpenCL-translated codes to calculate the amounts of resources to be used ("second resource amount calculation"). Here, the sum of the amounts of resources obtained according to the precompilation before the first measurement may be used without performing precompilation for the second resource amount calculation.

<Performance Measurement Section 116>

The performance measurement section 116 compiles the application according to the generated PLD processing pattern, deploys the compiled application to the verification machine 14, and performs processing for measuring the performance obtained when offloading the compiled application to the PLD according to the PLD processing pattern.

The performance measurement section 116 includes a binary file deployment section 116a (configured to deploy binary files). The binary file deployment section 116a deploys an execution file derived from the intermediate language to a verification machine 14 equipped with an FPGA.

The performance measurement section 116 executes the deployed binary file, measures the performance obtained when offloading is performed and returns the result of the performance measurement to the offload area extraction section 113a. In this case, the offload area extraction section 113a extracts another PLD processing pattern, and the intermediate language file output section 113b carries out a performance measurement for trial based on extracted intermediate language (see reference character e in FIG. 3, which will be described later).

A description will be given of a specific example of performance measurement.

The PLD processing pattern generation section 115 narrows down the loop statements to those having a high resource efficiency, and the execution file generation section 117 compiles the OpenCL-translated codes for offloading the narrowed-down loop statements. The performance measurement section 116 measures the performances of the compiled programs ("first performance measurement").

Further, from the loop statements having been subjected to the performance measurement, the PLD processing pattern generation section 115 makes a list of loop statements with improved performance compared with when executed on the CPU. The PLD processing pattern generation section 115 combines the listed loop statements to generate OpenCL-translated codes to be offloaded. The PLD processing pattern generation section 115 precompiles the combined offloading OpenCL-translated codes and calculates the amounts of the resources to be used.

It should be noted that the sum of the resource amounts obtained according to the precompilation before the first performance measurement may be used without performing precompilation. The execution file generation section 117 compiles the combined offloading OpenCL-translated codes and the performance measurement section 116 measures the performances of the compiled programs ("second performance measurement").

<Execution File Generation Section 117>

The execution file generation section 117 selects a PLD processing pattern with the highest processing performance from all the PLD processing patterns subjected to the performance measurement on the basis of the result of the performance measurement repeated for a predetermined number of times and compiles the application according to the selected PLD processing pattern with the highest processing performance to generate an execution file.

<Actual Environment Deployment Section 118>

The actual environment deployment section 118 deploys the generated execution file to the actual environment for user ("deployment of final binary file to actual environment"). The actual environment deployment section 118 determines a pattern that designates the final offload areas, and deploys the pattern to the actual environment for the user.

<Performance Measurement Test Extraction and Execution Section 119>

After the execution file is deployed, a performance measurement test extraction and execution section 119 extracts performance test items from the test case database 131 and performs a performance test.

After the execution file is deployed, the performance measurement test extraction and execution section 119 extracts performance test items from the test case database 131, and performs an automatic execution of the extracted performance test in order to indicate the performance to the user.

<Provision-to-User Section 120>

The provision-to-user section 120 presents, to the user, information on the price, performance and the like based on the result of the performance test ("provision of information on price, performance and the like to user"). The test case database 131 stores data for automatically performing the test for measuring the performance of the application. The provision-to-user section 120 presents, to the user, the result of the execution of the test data of the test case database 131 and the price of the entire system, which is determined from the unit prices of the resources (e.g., virtual machines, FPGA instances and GPU instances) used in the system. On the basis of the presented information on the price, performance and the like, the user determines whether to start using the service with billing.

An automatic offloading operation of the offload server 1 configured as described above will be described below.

[Automatic Offload Operation]

The offload server 1 according to the present embodiment is an example applied to FPGA automatic offloading of a user application logic as elemental technology of environment adaptive software.

Figure 3:
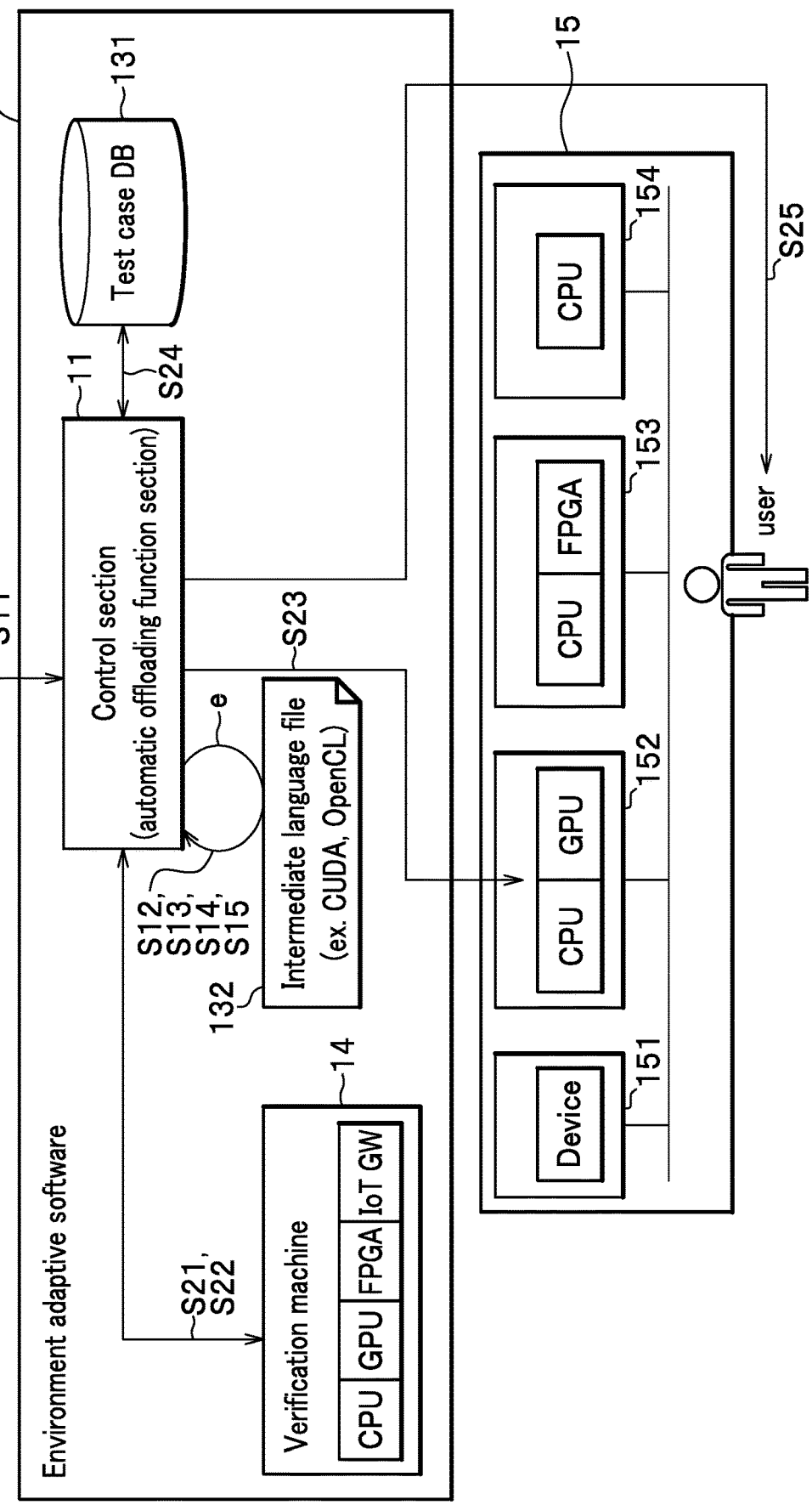
FIG. 3 is a diagram illustrating automatic offloading processing of the offload server according to the embodiment.

FIG. 3 is a diagram illustrating automatic offloading processing using the offload server 1.

As illustrated in FIG. 3, the offload server 1 is applied to elemental technology of environment adaptive software. The offload server 1 includes a control section (automatic offloading function section) 11, a test case database 131, an intermediate language file 132, and a verification machine 14.

The offload server 1 acquires application code 130 to be used by a user.

The user uses a device 151 of any of various types, a CPU-GPU-equipped device 152, a CPU-FPGA-equipped device 153, and a CPU-equipped device 154, for example. The offload server 1 automatically offloads functional processing to an accelerator of the CPU-GPU-equipped device 152 and to an accelerator of the CPU-FPGA-equipped device 153.

Operations of each section will be described with reference to the step numbers in FIG. 3.

<Step S11: Specify Application Code>

In step S11, the application code designation section 111 (see FIG. 2) identifies the processing function (such as image analysis) of the service being provided to the user. Specifically, the application code designation section 111 designates the input application code.

<Step S12: Analyze Application Code>

In step S12, the application code analysis section 112 (see FIG. 2) analyzes source code of the processing function and identifies structures such as loop statements and calls to an FFT library.

<Step S13: Extract Offloadable Area>

In step S13, the PLD processing designation section 113 (see FIG. 2) identifies loop statements (iteration statements) of the application, and, for each of the iteration statements, specifies parallel processing or pipeline processing on an FPGA and performs compilation using a high-level synthesis. Specifically, the offload area extraction section 113a (see FIG. 2) identifies processing offloadable to an FPGA, such as loop statements, and extracts OpenCL-translated codes as intermediate language according to the offload processing.

<Step S14: Output Intermediate File>

In step S14, the intermediate language file output section 113b (see FIG. 2) outputs the intermediate language file 132. The intermediate language extraction is not ended at one time, but is repeated for optimization through execution trials to search for appropriate offload areas.

<Step S15: Compile Error>

In step S15, the PLD processing pattern generation section 115 (see FIG. 2) excludes, from loop statements to be offloaded, any loop statement at which a compilation error occurs and generates a plurality of PLD processing patterns each of which specifies whether to perform FPGA processing for each of the iteration statements at which no compilation error occurs.

<Step S21: Deploy Binary Files>

In step S21, the binary file deployment section 116a (see FIG. 2) deploys an execution file derived from an intermediate language corresponding to a PLD processing pattern to the verification machine 14 including an FPGA. The binary file deployment section 116a launches the deployed file and executes an assumed test case to measure the performance obtained when offloading is performed.

<Step S22: Measure Performances>

In step S22, the performance measurement section 116 (see FIG. 2) executes the deployed file to measure the performance obtained when offloading is performed.

In order to make offload areas more appropriate, the result of the performance measurement is returned to the offload area extraction section 113a. Then, the offload area extraction section 113a extracts another pattern. Then, the intermediate language file output section 113b carries out a performance measurement for trial using the extracted intermediate language (see reference character e in FIG. 3). The performance measurement section 116 repeats the performance measurement on the verification environment and determines a final code pattern to deploy.

As indicated by reference character e in FIG. 3, the control section 11 repeatedly executes the above-described steps from step S12 to step S22. The automatic offloading function of the control section 11 is summarized as follows. The PLD processing designation section 113 identifies loop statements (iteration statements) of the application, specifies parallel processing or pipeline processing on the FPGA for each of the iteration statements according to OpenCL, and performs compilation using a high-level synthesis tool. Then, the PLD processing pattern generation section 115 excludes, from loop statements to be offloaded, any loop statement at which a compilation error occurs and generates a plurality of PLD processing patterns each of which specifies whether to perform PLD processing for each of the loop statements at which no compilation error occurs. Then, for each of the plurality of PLD processing patterns, the binary file deployment section 116a compiles the application according to the PLD processing pattern and deploys the compiled application to the verification machine 14, and the performance measurement section 116 performs processing for measuring the performance on the verification machine 14. The execution file generation section 117 selects a PLD processing pattern with the highest processing performance from all the PLD processing patterns subjected to the performance measurement on the basis of the result of the performance measurement repeated for a predetermined number of times and compiles the application according to the selected processing pattern to generate an execution file.

<Step S23: Deploy Final Binary Files to Actual Environment>

In step S23, the actual environment deployment section 118 determines a pattern that designates the final offload areas, and deploys the pattern to the actual environment for the user.

<Step S24: Extract Performance Test Cases and Run Automatically>

In step S24, after the execution file is deployed, the performance measurement test extraction and execution section 119 extracts performance test items from the test case database 131, and performs an automatic execution of the extracted performance test in order to indicate the performance to the user.

<Step S25: Provide Price and Performance to a User to Judge>

In step S25, the provision-to-user section 120 presents, to the user, information on the price, performance and the like based on the result of the performance test. On the basis of the presented information on the price, performance and the like, the user determines whether to start using the service with billing.

The above-described steps from step S11 to step S25 are performed in the background of service use of the user, and are assumed to be performed on the first day of temporary use of the service, for example. Further, in order to reduce the cost, the processing to be performed in the background may be performed only for offloading to a GPU/FPGA.

As described above, when the offload server 1 is applied to an elemental technology of environment adaptive software, the control section (automatic offloading function section) 11 of the offload server 1 extracts the areas to be offloaded from the source code of the application used by the user and outputs an intermediate language, in order to offload functional processing (steps S11 to S15). The control section 11 deploys the execution file derived from the intermediate language to the verification machine 14 and causes the verification machine 14 to execute the execution file to verify the effect of offloading (steps S21 to S22). The control section 11 repeats the verification, then determines appropriate offload areas, and then deploys the execution file to an actual environment that is actually provided to the user, to provide the execution file as a service (steps S23 to S25).

The processing flow of collectively performing the code conversion, the resource amount adjustment, and the deployment place adjustment, which are required for environment adaptation, has been described. However, it should be noted that this is not limiting and only desired processing may be extracted. For example, when only a code conversion is desired to be performed for an FPGA, it is possible to use only the environment adaptation function and the verification environment in the steps S11 to S21.

[Automatic Offloading to FPGA]

The above-described code analysis uses a syntax analysis tool, such as Clang, to analyze the application code. It is difficult to generalize the code analysis because the analysis needs to take into consideration the device to which offloading is to be performed. However, it is possible to identify the structure of code such as reference relationships between loop statements and variables and to identify functional blocks that perform FFT processing or calls to a library that performs FFT processing. It may be difficult for the offload server to automatically identify such functional blocks. Such functional blocks can be identified through similarity determination using a similar code detection tool such as Deckard. Clang is a tool for C/C++. A tool that is appropriate for the language to be analyzed need to be selected.

Further, when processing of an application is to be offloaded, consideration is required depending on the offload destination device, such as a GPU, FPGA, or IoT GW. In general, it is difficult to automatically find a setting that results in the maximum performance on the first try. Therefore, offload patterns are tried several times in a verification environment while repeating performance measurement, thereby finding a pattern that can achieve acceleration.

A description will be given below of a method for offloading loop statements in application software to an FPGA.

[Flowchart]

Figure 4:
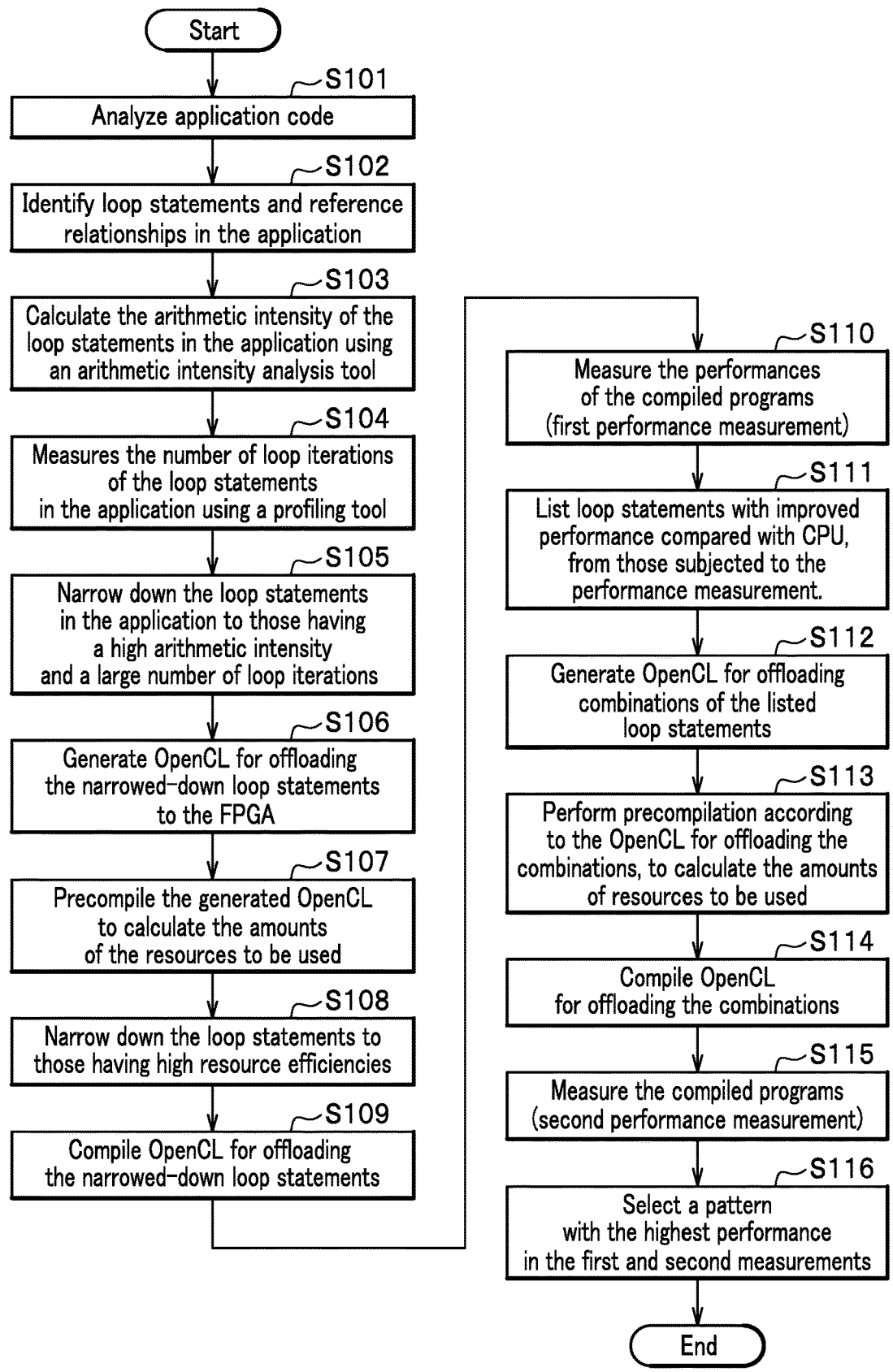
FIG. 4 is a flowchart for explaining an overview of operation of an implementation of the offload server according to the embodiment.

FIG. 4 is a flowchart for explaining an overview of operation of offload server 1.

In step S101, the application code analysis section 112 analyses application source code desired to be offloaded. The application code analysis section 112 analyzes loop statements and information concerning variables according to the language of source code.

In step S102, the PLD processing designation section 113 identifies loop statements and reference relationships in the application.

Then, the PLD processing pattern generation section 115 performs processing for narrowing down the identified loop statements to candidates for which FPGA offloading is to be carried out for trial. Arithmetic intensity is one measure on which to base the determination as to whether offloading of the loop statements is effective or not.

In step S103, the arithmetic intensity calculation section 114 calculates the arithmetic intensity of the loop statements in the application using an arithmetic intensity analysis tool. Arithmetic intensity is a measure that increases as the number of calculations increases and decreases as the number of accesses increases, and thus processing with high arithmetic intensity places a heavy processing load on the processor. In view of this, arithmetic intensities of loop statements are analyzed using the arithmetic intensity analysis tool and the loop statements are narrowed down to, as candidates to be offloaded, those having a high density. In view of this, arithmetic intensities of loop statements are analyzed using the arithmetic intensity analysis tool and the loop statements are narrowed down to, as candidates to be offloaded, those having a high density.

Loop statements with high arithmetic intensities may pose a problem if they excessively consume FPGA resources when being processed on the FPGA. A description will be given of calculation of the amount of resources used when high-arithmetic-intensity loop statements are processed on an FPGA.

The processing when compilation for an FPGA is to be carried out is such that a high-level language such as OpenCL is translated to a level such as HDL, which is a hardware description language and on the basis of which actual wiring processing and the like are performed. Whereas it takes a significant time to perform the wiring or the like, it takes only a time of the order of minutes up to the stage of an intermediate state such as HDL. Even in the stage of an intermediate state such as HDL, resources such as flip-flops and look-up tables to be used in the FPGA are identified. Therefore, the amount of resources to be used can be determined in a short time before the completion of the compilation by checking the stage of an intermediate state such as HDL.

In view of this, the PLD processing pattern generation section 115 of the present embodiment translates the loop statements of interest into a high-level language such as OpenCL and calculates the amounts of the resources first. In addition, as the arithmetic intensity and the amount of resources when the loop statement is offloaded are determined, a resource efficiency is determined as [arithmetic intensity]/[amount of resources] or [arithmetic intensity]× [number of loop iterations]/[amount of resources]. Then, the loop statements are further narrowed down to, as candidates to be offloaded, those having a high resource efficiency.

Returning to the flow illustrated in FIG. 4, in step S104, the PLD processing pattern generation section 115 measures the number of loop iterations of the loop statements in the application using a profiling tool such as gcov or gprof.

In step S105, the PLD processing pattern generation section 115 narrows down the loop statements to those having a high arithmetic intensity and a large number of loop iterations.

In step S106, the PLD processing pattern generation section 115 generates OpenCL-translated codes for offloading the narrowed-down loop statements to the FPGA.

Translation of a loop statement according to OpenCL (generation of an OpenCL-translated code) will now be described in further detail. Two processes are required for translating a loop statement into a high-level language by, for example, OpenCL. One is a process to separate the CPU processing program into a kernel (FPGA) section and a host (CPU) section in accordance with the grammar of a high-level language such as OpenCL. The other is to use an acceleration technique when performing the separation. In general, techniques for acceleration using an FPGA include local memory caching, stream processing, multiple instantiation, unroll processing of loop statements, integration of nested loop statements, memory interleaving and the like. These techniques are not necessarily effective for some loop statements but are commonly used methods for acceleration.

Now, several loop statements with high resource efficiencies have been selected. Then, offload patterns as many as the number of performance measurements to be performed are generated using the selected loop statements. Regarding the acceleration by an FPGA, there is a case where acceleration is performed by applying an amount of FPGA resources only to one process in a concentrated manner, and there is even another case where acceleration is performed by distributing the FPGA resources to a plurality of processes. A certain number of patterns of selected single loop statements are generated and precompiled as a preparation stage before operating on the actual machine equipped with an FPGA.

In step S107, the PLD processing pattern generation section 115 precompiles the generated OpenCL-translated codes to calculate the amounts of the resources to be used ("first resource amount calculation").

In step S108, the PLD processing pattern generation section 115 narrows down the loop statements to those having a high resource efficiency.

In step S109, the execution file generation section 117 compiles OpenCL-translated codes for offloading the narrowed-down loop statements.

In step S110, the performance measurement section 116 measures the performance of the compiled programs ("first performance measurement").

In step S111, the PLD processing pattern generation section 115 makes a list of loop statements with improved performance compared with when executed on the CPU, from the loop statements having been subjected to the performance measurement.

In step S112, the PLD processing pattern generation section 115 combines the listed loop statements to generate OpenCL-translated codes to be offloaded.

In step S113, the PLD processing pattern generation section 115 precompiles the combined offloading OpenCL-translated codes to calculate the amounts of resources to be used ("second resource amount calculation"). It should be noted that the sum of the resource amounts obtained according to the precompilation before the first measurement may be used without performing precompilation for the second resource amount calculation. This can reduce the number of times of the precompilation.

In step S114, the execution file generation section 117 compiles the combined OpenCL-translated codes for offloading.

In step S115, the performance measurement section 116 measures the performances of the compiled programs ("second performance measurement").

In step S116, the actual environment deployment section 118 selects a pattern with the highest performance in the first and second measurements, and the processing of the flow ends.

Figure 5:
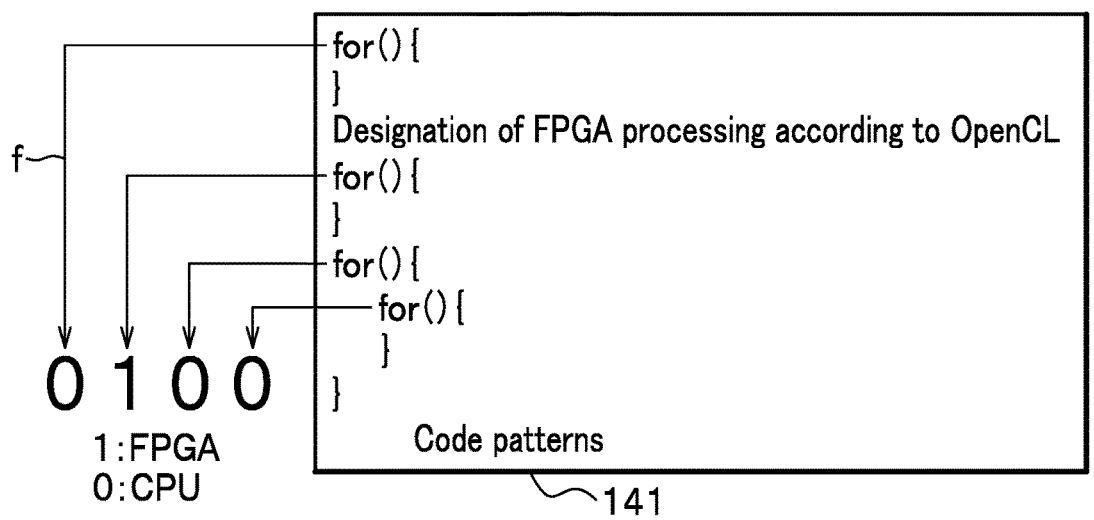
FIG. 5 is a diagram for explaining an overview of operation of the implementation of the offload server according to the embodiment.

In this way, the automatic offloading of loop statements to the FPGA narrows down the loop statements to those having a high arithmetic intensity, a large number of loop iterations, and high resource efficiency in order to generate offload patterns, and then searches for a high-speed pattern through measurement in a verification environment (see FIG. 5).

Example of Offload Pattern Generation

FIG. 5 is a diagram illustrating the concept of a search by the PLD processing pattern generation section 115.

Specifically, the control section (automatic offloading function section) 11 (see FIG. 2) analyses application code 130 (see FIG. 3) used by the user and checks the parallelizability of the for statements on the basis of the code patterns 141 of the application code 130 as illustrated in FIG. 5 As illustrated with reference character f in FIG. 5, when four for statements are found in the code pattern 141, one digit of 1 or 0 is randomly assigned for each for statement, and here, four digits of 1 or 0 are assigned to the four for statements. Here, 1 is assigned to each for statement to be processed on the FPGA and 0 is assigned to each for statement not to be processed on the FPGA (in other words, to be processed on the CPU).

[Flow of Finding of OpenCL Final Solution Form C Code]

Figure 6:
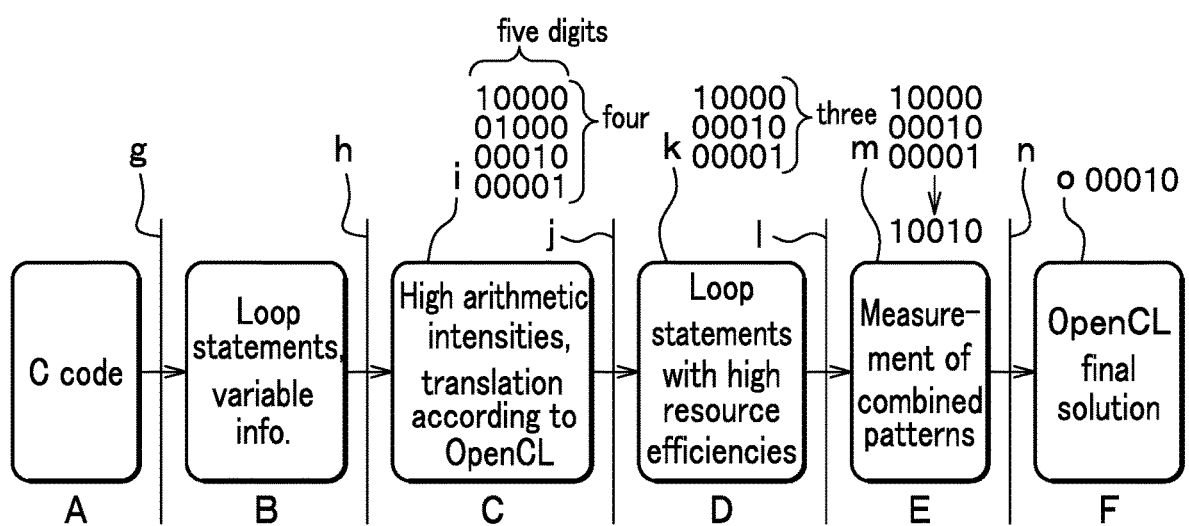
FIG. 6 is a diagram for explaining a flow of how the offload server according to the embodiment finds an OpenCL final solution from C code.

Procedures A to F in FIG. 6 illustrates a flow of finding OpenCL final solution from C code.

The application code analysis section 112 (see FIG. 2) parses (see reference character g in FIG. 6) "C code" in step A illustrated in FIG. 6, and the PLD processing designation section 113 (see FIG. 2) identifies "Loop statements, variable information" in procedure B illustrated in FIG. 6 (see FIG. 5).

The arithmetic intensity calculation section 114 (see FIG. 2) performs arithmetic intensity analysis on the identified "Loop statements, variable information" using an arithmetic intensity analysis tool. The PLD processing pattern generation section 115 narrows down the loop statements to, as candidates to be offloaded, those having a high arithmetic intensity. Further, the PLD processing pattern generation section 115 performs profiling analysis (see reference character h in FIG. 6) using a profiling tool to further narrow down the loop statements to those having a high arithmetic intensity and a large number of loop iterations.

The PLD processing pattern generation section 115 then generates an OpenCL-translated code (performs translation according to OpenCL) for offloading each of the narrowed-down loop statements to the FPGA.

Further, in combination with the code separation, an acceleration technique such as unrolling (described later) is introduced in performing translation according to OpenCL.

Example of "High Arithmetic Intensity, Translation According to OpenCL" (1): Procedure C For example, when five for statements (assignments of five digits of 1 or 0) are detected from the code patterns 141 (see FIG. 5) of the application code 130, the for statements are narrowed down to four statements (four statements are selected) by the arithmetic intensity analysis. Specifically, four offload patterns "10000", "01000", "00010", and "00001" of for statements are selected from the five for statements, as illustrated with reference character i in FIG. 6.

<Example of "unrolling" performed along with code separation when translation according to OpenCL is performed>
For a loop statement [k=0; k<10; k++] {
} which is described in the CPU side program in a case where data is transferred from an FPGA to the CPU, a '¥pragma unroll' is designated above the loop statement.

That is, '¥pragma unroll' is described as follows:

```
¥pragma unroll
for(k=0; k<10; k++] {
}
```

By designating 'unroll' with a syntax, such as ¥pragma unroll, conforming to a tool of Intel or Xilinx (registered trademark), the loop statement in the example of unrolling given above can be unrolled in such a manner that i=0, i=1, i=2 so as to be executed in a pipeline. As a result, while the amount of resources used increases by a factor of 10, acceleration may be achieved.

Further, designation may be made such that not all the loop iterations be unrolled but, for example, five iterations be unrolled, in which case two iterations of the loop are unrolled into five.

Here, the description of the example of "unrolling" has finished.

Next, the PLD processing pattern generation section 115, using the amounts of resources, further narrows down the high-arithmetic-intensity loop statements, which have been narrowed down as candidates to be offloaded. Specifically, the PLD processing pattern generation section 115 calculates the amounts of resources and extracts loop statements with high resource efficiency from the high-arithmetic-intensity loop statement candidates to be offloaded by analyzing resource efficiency (=[arithmetic intensity]/[amount of resources to be used when processed on FPGA] or [arithmetic intensity]×[number of loop iterations]/[amount of resources to be used when processed on FPGA]).

Reference character j in FIG. 6 represents that the PLD processing pattern generation section 115 compiles the OpenCL-translated codes for offloading the selected loop statements.

Example of "High Arithmetic Intensity, Translation According to OpenCL (2)

As illustrated with reference character k in FIG. 6, the four offload patterns "10000", "01000", "00010", and "00001", narrowed down as a result of the arithmetic intensity analysis, are narrowed down to three offload patterns, "10000", "00010", and "00001", by the resource efficiency analysis described above.

Heretofore, a description has been given of "high arithmetic intensity, translation according to OpenCL", illustrated in procedure C in FIG. 6.

For the "Loop statements with high resource efficiency" represented in procedure D illustrated in FIG. 6, the performance measurement section 116 measures the performance of the compiled programs ("first performance measurement").

Then, from the loop statements subjected to the performance measurement, the PLD processing pattern generation section 115 makes a list of loop statements with improved performance compared with when executed on a CPU. Then, in the same way as described above, the amounts of resources are calculated, the OpenCL-translated codes for offloading are compiled, and the performance of the compiled programs are measured.

<Example of "High Arithmetic Intensity, Translation According to OpenCL" (3)>

As illustrated with reference character k in FIG. 6, a first measurement is performed for the three offload patterns "10000", "00010", and "00001". If the performance of two offload patterns "10000" and "00010" is high among the measured three offload patterns, a second measurement is performed for a combination of "10000" and "00010".

Reference character l in FIG. 6 represents that the execution file generation section 117 compiles OpenCL-translated codes for offloading the narrowed-down loop statements (full compilation).

The "combined pattern measurement", represented as procedure E illustrated in FIG. 6 represents a verification pattern measurement in which the individual candidate loop statements are measured and then the combination of the candidate loop statements is measured.

<Example of "High Arithmetic Intensity, Translation According to OpenCL" (4)>

As illustrated with reference character m in FIG. 6, the second measurement is performed for "10010", which is the combination of "10000" and "00010". After performing the measurement two times, "00010", which resulted in the highest speed in the first and second measurements, was selected. In this case, "00010" is the final solution. There is a case where the combined pattern cannot be measured due to resource amount limitations. In such a case, the combination may be skipped and a pattern that results in the highest speed may be selected from the individual results.

In this way, "00010" (see reference character o in FIG. 6) was selected as the "OpenCL final solution" illustrated in procedure F in FIG. 6.

<Deployment>

With the PLD processing pattern having the highest processing performance, which is the final OpenCL solution, the deployment to the actual environment is performed anew to provide it to the user.

Implementation Example

A description will be given of an implementation.

An FPGA such as Intel PAC with Intel Arria 10 GX FPGA can be used.

Intel Acceleration Stack (Intel FPGA SDK for OpenCL, Quartus Prime Version) and the like can be used for FPGA processing.

Intel FPGA SDK for OpenCL is a high-level synthesis tool (HLS) that interprets #pragma for Intel or the like in addition to standard OpenCL.

In the implementation example, OpenCL code describing a kernel to be processed on an FPGA and a host program to be processed on a CPU are interpreted to output information such as the amount of resources, and wiring operation and the like for the FPGA are performed so that the program can run on the FPGA. It takes a long time, such as about three hours, to cause even a small program of about 100 lines to operate on the actual machine equipped with an FPGA. However, when the amount of the resource available is exceeded, an error occurs in an early stage. In the case of OpenCL code that cannot be processed on the FPGA, an error is output after several hours.

In the implementation example, when a request for using a C/C++ application is received, the code of the C/C++ application is first analyzed to find for statements and identify a program structure such as variable data used in the for statements. A syntax parsing library such as LLVM/Clang is used to parse syntax.

In the implementation example, next, in order to estimate the possibility of effectiveness of FPGA offloading of each loop statement, an arithmetic intensity analysis tool is executed to obtain a measure of arithmetic intensity which is determined by the number of computations and the number of accesses and the like. For the arithmetic intensity analysis, a tool such as ROSE Framework can be used. The analysis is applied only to a number of loop statements with higher arithmetic intensities.

Then, the number of loop iterations of each loop is obtained using a profiling tool such as gcov. Top $\alpha$ pieces of loop statements ranked with respect to [arithmetic intensity]×[number of loop iterations] are selected as candidates.

In the implementation example, next, OpenCL code for offloading to the FPGA is generated for each individual loop statement with high arithmetic intensity. The OpenCL code separates the loop statement as an FPGA kernel and the rest as a CPU host program. To generate the FPGA kernel code, a predetermined number b of unrolls of the loop statement may be performed as a speeding-up acceleration technique. Loop statement unroll processing has the effect of speeding up, although it increases the amount of resources required. Therefore, the number of unrolls is limited to a certain number b to prevent the amount of resource required from massively increasing.

In the case of the implementation example, next, a pieces of OpenCL codes are precompiled using Intel FPGA SDK for OpenCL and the amounts of resources, such as flip-flops and look-up tables, to be used are calculated. The amounts of resources to be used are indicated as the proportions to the total amount of resources. Here, the resource efficiency of each loop statement is calculated from the arithmetic intensity and the amount of resources, or from the arithmetic intensity, the number of loop iterations, and the amount of resources. For example, a loop statement with an arithmetic intensity of 10 and a resource amount of 0.5 has a resource efficiency of 10/0.5=20; a loop statement with an arithmetic intensity of 3 and a resource amount of 0.3 has a resource efficiency of 3/0.3=10. Thus, the former resource efficiency is higher than the latter. Alternatively, the above resource efficiencies may be further multiplied by the number of loop iterations. C pieces of loop statements with high resource efficiency are selected from the loop statements.

In the case of the implementation example, next, patterns to be measured are generated from the c pieces of loop statements as candidates. For example, if the first and third loop statements have a high resource efficiency, the implementation generates and compiles OpenCL patterns that respectively offload the first loop statement and the third loop statement, and measures the performances. If offload patterns of a plurality of single loop statements can achieve acceleration (for example, if both the first and third loop statements can achieve acceleration), an OpenCL pattern of their combination (e.g., a pattern that offloads both the first and third loop statements) is generated, compiled and subjected to the performance measurement.

It should be noted that when a combination of single loops is generated, the amounts of resources to be used are also combined. Therefore, if the amount of resources to be used does not fall within an upper limit, the combination pattern for the combination of the single loops is not generated. Once d pieces of patterns, including combinations, have been generated, performance measurement is performed on a server equipped with an FPGA in a verification environment. For the performance measurement, sample processing specified for the application to be accelerated is performed. For example, in the case of a Fourier transform application, the performance is measured using the transform processing with sample data as a benchmark.

In the case of the implementation example, a high-speed pattern is selected from a plurality of measured patterns as the solution.

[Hardware Configuration]

Figure 7:
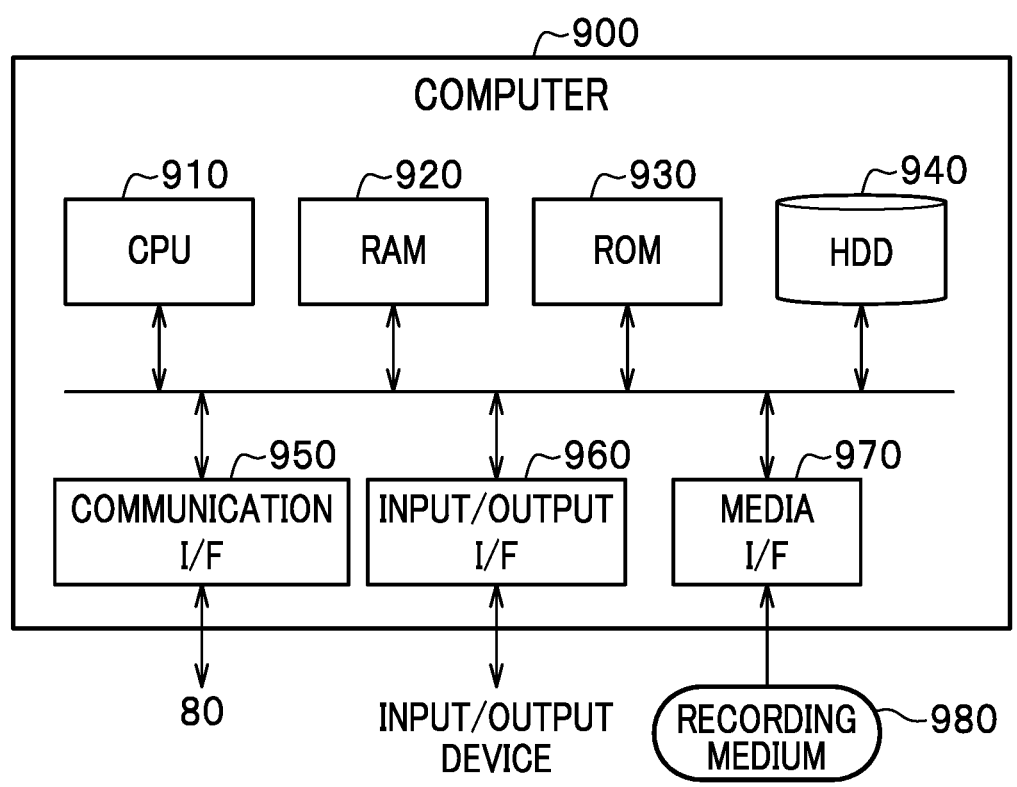
FIG. 7 is a hardware configuration diagram illustrating an example computer that implements the functions of the offload server according to an embodiment of the present invention.

The offload server 1 according to the present embodiment is embodied by, for example, a computer 900 having a configuration as illustrated in FIG. 7.

FIG. 7 is a hardware configuration diagram illustrating an example of computer 900 that embodies the functions of offload server 1.

Computer 900 includes a CPU 910, a RAM 920, a ROM 930, an HDD 940, a communication interface (I/F: Interface) 950, an input/output interface (I/F) 960, and a media interface (I/F) 970.

CPU 910 operates and performs control of each portion according to a program stored in ROM 930 or HDD 940. ROM 930 stores a boot program to be executed by CPU 910 when computer 900 starts up, a program that relies on the hardware of computer 900, and the like.

HDD 940 stores programs to be executed by CPU 910, data to be used by the programs, and the like. Communication interface 950 receives data from another device via a communication network 80, sends the received data to CPU 910, and transmits data generated by CPU 910 to another device via communication network 80.

CPU 910 controls an output device such as a display or a printer and an input device such as a keyboard or a mouse via input/output interface 960. CPU 910 receives data from the input device via input/output interface 960. Also, CPU 910 outputs generated data to the output device via input/output interface 960.

Media interface 970 reads a program or data stored in a recording medium 980 and provides the read program or data to CPU 910 via RAM 920. CPU 910 loads the program from recording medium 980 onto RAM 920 via media interface 970 and executes the loaded program. Recording medium 980 is, for example, an optical recording medium such as a DVD (Digital Versatile Disc) or PD (Phase change rewritable Disk), a magneto-optical recording medium such as an MO (Magneto Optical disk), a tape medium, a magnetic recording medium, a semiconductor memory, or the like.

For example, if computer 900 functions as an offload server 1 according to the present embodiment, CPU 910 of computer 900 embodies the function of each portion of offload server 1 by executing the program loaded on RAM 920. Also, HDD 940 stores the data in each portion of offload server 1. CPU 910 of computer 900 reads these programs from recording medium 980 and executes them, but in another example, these programs may be received from another device via communication network 80.

Effects

As described above, The offload server 1 according to the present embodiment includes: the application code analysis section 112 configured to analyze source code of an application; the PLD processing designation section 113 configured to identify loop statements of the application, generate a plurality of offload processing patterns each of which designates parallel processing and/or pipeline processing on the PLD according to OpenCL for a respective one of the identified loop statements, and perform compilation of the application for each of the plurality of offload processing patterns; the arithmetic intensity calculation section 114 configured to calculate, for each of the loop statements of the application, an arithmetic intensity of the loop statement; a PLD processing pattern generation section, implemented using one or more of the one or more hardware processors, configured to, on the basis of the arithmetic intensities calculated by the arithmetic intensity calculation section, narrow down the loop statements to, as candidates to be offloaded, those having an arithmetic intensity higher than a predetermined threshold, and generate a plurality of PLD processing patterns based on the narrowed-down loop statements; the performance measurement section 116 configured to, for each of the generated plurality of PLD processing patterns, compile the application according to the PLD processing pattern, deploy the compiled application to the accelerator verification device 14, and perform processing for a measurement of a performance obtained when offloading the compiled application to the PLD according to the PLD processing pattern; and the execution file generation section 117 configured to select a PLD processing pattern with a highest processing performance as a solution from the plurality of PLD processing patterns on the basis of a result of the performance measurement by the processing for the measurement of the performance, and compile the application according to the PLD processing pattern with the highest processing performance to generate an execution file.

in this way, it is possible to narrow down the patterns to be actually subjected to performance measurement, perform deployment to a verification environment, perform compilation, and then perform performance measurement on the actual machine equipped with a PLD (e.g., FPGA), to reduce the number of times of the performance measurement. As a result, it is possible to perform automatic offloading of loop statements of an application to the PLD at high speed.

The present embodiment is characterized in that the PLD processing pattern generation section 115 is configured to: measure the number of loop iterations of each of the loop statements of the application; and narrow down the loop statements to, as the candidates to be offloaded, those having an arithmetic intensity higher than a predetermined threshold value and having a larger number of loop iterations than a predetermined number of loop iterations.

In this way, it is possible to further narrow down the loop statements by narrowing down the loop statements with high arithmetic intensities and a large number of loop iterations, thereby to perform automatic offloading of loop statements in the application at higher speed.

The present embodiment is characterized in that the PLD processing pattern generation section 115 is configured to: for each of the narrowed down loop statements, generate an OpenCL-translated code for offloading the narrowed-down statement to the PLD and precompile the generated OpenCL-translated code to calculate an amount of resources to be used in PLD processing; and on the basis of the calculated arithmetic intensities and the calculated amounts of the resources, further narrow down the candidates to be offloaded.

In this way, by analyzing the arithmetic intensity of the loop statements, the number of loop iterations, and the amounts of resources and narrowing down the loop statements to, as candidates to be offloaded, those having a high resource efficiency, it is possible to avoid excessive consumption of PLD (e.g., FPGA) resources while further narrowing down the loop statements and to perform automatic offloading of the loop statements of the application at higher speed. Moreover, regarding the calculation of the amount of resources to be used in PLD processing, as it takes only a short time on the order of minutes to reach the stage of an intermediate state such as HDL, the amount of resources to be used can be known in a short time before the completion of compilation.

The present embodiment is characterized in that the PLD processing pattern generation section 115 is configured to: select top $\alpha$ pieces of loop statements with high arithmetic intensities on the basis of the arithmetic intensities calculated by the arithmetic intensity calculation section 114; while applying unroll processing to, of the top $\alpha$ pieces of loop statements, a limited number b of loop statements, precompile the $\alpha$ pieces of loop statements to calculate the amount of resources to be used in the PLD processing for each of the $\alpha$ pieces of loop statements; calculate resource efficiencies based on the calculated arithmetic intensities and the calculated amounts of the resources; select c pieces of loop statements each having a resource efficiency higher than a predetermined value from the top $\alpha$ pieces of loop statements with high arithmetic intensities, on the basis of the calculated resource efficiencies; and regarding the c pieces of loop statements as the candidates, generate d pieces of OpenCL patterns to be measured, and that the performance measurement section 116 is configured to, for each of the d pieces of patterns: compile the application according to the pattern; deploy the compiled application to the accelerator verification device; and execute processing for the measurement of the performance obtained when offloading the compiled application to the PLD to measure the performance.

In this way, by narrowing down the loop statements on a step-by-step basis in terms of the amount of resource, the number of unroll processes, the resource efficiencies, and the combined patterns, it is possible to narrow down the loop statements more appropriately, thereby to perform automatic offloading of loop statements of the application with higher performance.

The present embodiment is characterized in that the PLD processing pattern generation section 115 is configured to, for each of the narrowed-down loop statements of the candidates to be offloaded: generate an OpenCL-translated code for offloading the narrowed down loop statement to the PLD; precompile the generated OpenCL-translated code to calculate an amount of resources to be used in PLD processing; and calculate a resource efficiency on the basis of the calculated arithmetic intensity and the calculated amount of the resources, and that the PLD processing pattern generation section 115 is further configured to, on the basis of the calculated resource efficiencies, further narrow down the candidates to be offloaded.

In this way, by calculating the resource efficiencies, it is possible to appropriately narrow down the loop statements that cannot be determined from the arithmetic intensities or the resource amount alone, thereby to perform automatic offloading of loop statements of an application with higher performance.

The present invention provides an offload program for causing a computer to function as the offload server described above.

Thus, the functions of the offload server 1 described above can be implemented using a commonly used computer.

Among the processing described in the embodiment, all or some of the processing described as being performed automatically may be performed manually, or all or some of the processing described as being performed manually may be performed automatically using a known method. In addition, information including process procedures, control procedures, specific names, various types of data and parameters described and illustrated in the description and drawings may be changed as appropriate unless otherwise stated.

Further, the components of the devices illustrated in the drawings are functionally conceptual and do not necessarily need to be physically configured as illustrated. In other words, specific form of distribution and integration of the devices are not limited to those illustrated in the drawings and all or some of the devices can be distributed or integrated functionally or physically in any units according to various loads and usages.

Further, some or all of the configurations, functions, processing units, processing means and the like described above may be implemented in hardware by, for example, designing them in integrated circuits. Further, the configurations, functions and the like described above may be implemented in software that causes a processor to interpret and execute a program that implements the functions. The program that implements the functions and information such as tables and files can be held in a recording device such as a memory, a hard disk, or an SSD (Solid State Drive) or a recording medium such as an IC (Integrated Circuit) card, an SD (Secure Digital) card, or an optical disc.

Further, any mode may be used in the present embodiment as long as FPGA processing can be offloaded.

In the description of the present embodiment, for statements are exemplified as iteration statements (loop statements). However, the iteration statements include while statements and do-while statements other than for statements. However, for statements, which specifies the continuation conditions or the like, are more suitable.

REFERENCE SIGNS LIST

1 Offload server
11 Control section
12 Input/Output section
13 Storage section
14 Verification machine (accelerator verification device)
15 OpenIoT resource
111 Application code designation section
112 Application code analysis section
113 PLD processing designation section
113a Offload area extraction section
113b Intermediate language file output section
114 Arithmetic intensity calculation section
115 PLD processing pattern generation section
116 Performance measurement section
116a Binary file deployment section
117 Execution file generation section
118 Actual environment deployment section
119 Performance measurement test extraction and execution section
120 Provision-to-user section
130 Application code
131 Test case database
132 Intermediate language file
151 Various types of devices
152 CPU-GPU-equipped device
153 CPU-FPGA-equipped device
154 CPU-equipped device

The invention claimed is:

1. An offload server that offloads specific processing of an application to a Programmable Logic Device (PLD), the offload server comprising:
one or more hardware processors;
an application code analysis section, implemented using the one or more hardware processors, configured to analyze source code of the application;
a PLD processing designation section, implemented using the one or more hardware processors, configured to identify loop statements of the application, generate a plurality of offload processing patterns, each of the plurality of offload processing patterns designates parallel processing and/or pipeline processing on the PLD according to Open Computing Language (OpenCL) for a respective one of the loop statements, and perform compilation of the application for each of the plurality of offload processing patterns;
an arithmetic intensity calculation section, implemented using the one or more hardware processors, configured to calculate, for each of the loop statements of the application, an arithmetic intensity of the loop statement;
a PLD processing pattern generation section, implemented using the one or more hardware processors, configured to, based on the arithmetic intensities, narrow down the loop statements to loop statements as candidates to be offloaded, wherein each of the narrowed-down loop statements having an arithmetic intensity higher than a predetermined threshold, and generate a plurality of PLD processing patterns based on the narrowed-down loop statements;
a performance measurement section, implemented using the one or more hardware processors, configured to, for each of the plurality of PLD processing patterns, compile the application according to the PLD processing pattern, deploy the compiled application to an accelerator verification device, and perform processing for a measurement of a performance obtained when offloading the compiled application to the PLD according to the PLD processing pattern; and
an execution file generation section, implemented using the one or more hardware processors, configured to select a PLD processing pattern of the plurality of PLD processing patterns with a highest processing performance as a solution based on a result of the processing for the measurement of the performance, and compile the application according to the PLD processing pattern with the highest processing performance to generate an execution file.

2. The offload server according to claim 1, wherein the PLD processing pattern generation section is further configured to:
measure a number of loop iterations of each of the loop statements of the application; and
narrow down the loop statements to loop statements, as the candidates to be offloaded, wherein each of the narrowed-down loop statements having the arithmetic intensity higher than the predetermined threshold value and having a larger number of loop iterations than a predetermined number of loop iterations.

3. The offload server according to claim 1, wherein the PLD processing pattern generation section is further configured to:
for each of the narrowed-down loop statements, generate an OpenCL-translated code for offloading the narrowed-down loop statements to the PLD and precompile the OpenCL-translated code to calculate an amount of resources to be used in PLD processing; and based on the arithmetic intensities and the amounts of the resources, further narrow down the candidates to be offloaded.

4. The offload server according to claim 3, wherein the PLD processing pattern generation section is further configured to:
select top α pieces of the narrowed-down loop statements;
while applying unroll processing to, of the top a pieces of the narrowed-down loop statements, a limited number b of the loop statements, precompile the top α pieces of the narrowed-down loop statements to calculate the amount of the resources to be used in the PLD processing for each of the top a pieces of the narrowed-down loop statements;
calculate resource efficiencies based on the arithmetic intensities and the amounts of the resources;
select c pieces of the loop statements based on the resource efficiencies, each of the c pieces of the loop statements having a resource efficiency higher than a predetermined value from the top α pieces of the narrowed-down loop statements; and
regarding the c pieces of the loop statements as the candidates, generate d pieces of OpenCL patterns to be measured, and
wherein the performance measurement section is further configured to, for each of the d pieces of OpenCL patterns:
compile the application according to each of the d pieces of OpenCL patterns;
deploy the compiled application to the accelerator verification device; and
execute the processing for the measurement of the performance obtained when offloading the compiled application to the PLD to measure the performance.

5. The offload server according to claim 1, wherein the PLD processing pattern generation section is further configured to, for each of the narrowed-down loop statements:
generate an OpenCL-translated code for offloading the narrowed-down loop statements to the PLD;
precompile the generated OpenCL-translated code to calculate an amount of resources to be used in PLD processing; and
calculate a resource efficiency based on the arithmetic intensity and the amount of the resources, and
wherein the PLD processing pattern generation section is further configured to, based on the resource efficiencies, further narrow down the candidates to be offloaded.

6. An offload control method for an offload server that offloads specific processing of an application to a Programmable Logic Device (PLD), the offload server comprising one or more hardware processors, wherein the offload control method causing the offload server to perform steps of:
analyzing source code of the application;
identifying loop statements of the application and generating a plurality of offload processing patterns, each of the plurality of offload processing patterns designates parallel processing, pipeline processing, and/or unroll processing on the PLD according to Open Computing Language (OpenCL) for a respective one of the loop statements, and performing compilation of the application according to each of the plurality of offload processing patterns;
calculating, for each of the loop statements of the application, an arithmetic intensity of the loop statement;
based on the arithmetic intensities, narrowing down the loop statements to loop statements as candidates to be offloaded, wherein each of the narrowed-down loop statements having an arithmetic intensity higher than a predetermined threshold, and generating a plurality of PLD processing patterns based on the narrowed-down loop statements;
for each of the plurality of PLD processing patterns, compiling the application according to the PLD processing pattern, deploying the compiled application to an accelerator verification device, and performing processing for a measurement of a performance obtained when offloading the compiled application to the PLD according to the PLD processing pattern; and
selecting a PLD processing pattern of the plurality of PLD processing patterns with a highest processing performance as a solution based on a result of the processing for the measurement of the performance, and compiling the application according to the PLD processing pattern with the highest processing performance to generate an execution file.

7. A non-transitory computer-readable medium storing a computer program configured to cause an offload server to offload specific processing of an application to a Programmable Logic Device (PLD), the offload server comprising one or more hardware processors, the computer program comprising:
an application code analysis section, executed by the one or more hardware processors, configured to analyze source code of the application;
a PLD processing designation section, executed by the one or more hardware processors, configured to identify loop statements of the application, generate a plurality of offload processing patterns, each of the plurality of offload processing patterns designates parallel processing and/or pipeline processing on the PLD according to Open Computing Language (OpenCL) for a respective one of the identified loop statements, and perform compilation of the application for each of the plurality of offload processing patterns;
an arithmetic intensity calculation section, executed by the one or more hardware processors, configured to calculate, for each of the loop statements of the application, an arithmetic intensity of the loop statement;
a PLD processing pattern generation section, executed by the one or more hardware processors, configured to, based on the arithmetic intensities, narrow down the loop statements to loop statements as candidates to be offloaded, wherein each of the narrowed-down loop statements having an arithmetic intensity higher than a predetermined threshold, and generate a plurality of PLD processing patterns based on the narrowed-down loop statements;
a performance measurement section, executed by the one or more hardware processors, configured to, for each of the plurality of PLD processing patterns, compile the application according to the PLD processing pattern, deploy the compiled application to an accelerator verification device, and perform processing for a measurement of a performance obtained when offloading the compiled application to the PLD according to the PLD processing pattern; and
an execution file generation section, executed by the one or more hardware processors, configured to select a PLD processing pattern of the plurality of PLD processing patterns with a highest processing performance as a solution based on a result of the processing for the measurement of the performance, and compile the application according to the PLD processing pattern with the highest processing performance to generate an execution file.

\* \* \* \* \*